United States Patent
Thunberg et al.

(10) Patent No.: US 9,273,726 B2
(45) Date of Patent: Mar. 1, 2016

(54) METHOD, CAGE AND ROLLING BEARING

(71) Applicant: AKTIEBOLAGET SKF, Göteborg (SE)

(72) Inventors: Sten Thunberg, Göteborg (SE); Christophe Baillie, Genas (FR); Sachin Naik, Pune Maharashtra (IN)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/378,369

(22) PCT Filed: Feb. 6, 2013

(86) PCT No.: PCT/SE2013/000017
§ 371 (c)(1),
(2) Date: Aug. 13, 2014

(87) PCT Pub. No.: WO2013/122526
PCT Pub. Date: Aug. 22, 2013

(65) Prior Publication Data
US 2015/0016764 A1    Jan. 15, 2015

(30) Foreign Application Priority Data
Feb. 14, 2012  (SE) ...................................... 1200091

(51) Int. Cl.
*F16C 33/54* (2006.01)
*F16C 33/46* (2006.01)
(Continued)

(52) U.S. Cl.
CPC ............... *F16C 33/54* (2013.01); *F16C 33/425* (2013.01); *F16C 33/46* (2013.01); *F16C 33/467* (2013.01);
(Continued)

(58) Field of Classification Search
CPC ...... F16C 33/425; F16C 33/46; F16C 33/543; F16C 2300/14; F16C 33/4676; F16C 33/467; F16C 33/4694; Y10T 29/49691; B23K 11/01; B23K 11/10; B23B 2240/16; B21D 53/1211
USPC ................. 384/568, 572, 573, 577, 579, 597; 29/898.067
See application file for complete search history.

(56) References Cited

U.S. PATENT DOCUMENTS 1,358,848 A    11/1920  Hindle et al.
1,650,852 A *  11/1927  Rouanet ................... 29/898.067
(Continued)

FOREIGN PATENT DOCUMENTS

DE           367988 C       1/1923
DE        19910928 A1 *     9/2000
(Continued)

*Primary Examiner* — Marcus Charles
(74) *Attorney, Agent, or Firm* — Bryan Peckjian; SKF USA Inc. Patent Dept.

(57) ABSTRACT

The invention concerns a method to produce a cage (1) for a rolling bearing (40), wherein the method comprises the steps of; —(10): providing an elongated metal profile (1) comprising a first and second distant ends (12, 13), wherein the metal profile (1) is essentially ring-shaped, —(20): subsequently joining the first and second ends (12, 13) of the metal profile (1) to thereby form a closed ring (1), —(30): forming in the closed ring (1) a plurality of openings (14) on at least one axial side face of the ring (1), wherein the openings (14) are meant to receive at least one rolling element (43) of the rolling bearing (40), and wherein the forming of the openings (14) is made by drilling from the axial side face of the ring (1). Furthermore, the invention regards a cage (1) and a rolling bearing (40).

11 Claims, 4 Drawing Sheets

(51) Int. Cl.
*F16C 33/48* (2006.01)
*F16C 33/42* (2006.01)

(52) U.S. Cl.
CPC ........... *F16C 33/4694* (2013.01); *F16C 33/543* (2013.01); *F16C 2300/14* (2013.01); *Y10T 29/49691* (2015.01)

(56) References Cited

U.S. PATENT DOCUMENTS

| | | | |
|---|---|---|---|
| 2,034,566 A * | 3/1936 | Fernstrom | 384/577 |
| 2,611,670 A * | 9/1952 | Palmgren | 384/577 |
| 3,290,102 A * | 12/1966 | Eriksson et al. | 384/577 |
| 3,526,026 A * | 9/1970 | Warchol | 29/898.067 |
| 3,605,247 A * | 9/1971 | Bingle et al. | 228/149 |
| 3,902,772 A * | 9/1975 | Spate | 384/579 |
| 4,320,565 A * | 3/1982 | Warchol | 29/898.067 |
| 4,322,878 A | 4/1982 | Warchol | |
| 4,952,079 A * | 8/1990 | Lingner | 384/575 |
| 6,330,748 B1 | 12/2001 | Muntnich | |
| 6,474,874 B1 * | 11/2002 | Nogi | 384/572 |
| 8,007,184 B2 * | 8/2011 | Murai et al. | 384/558 |
| 8,579,516 B2 * | 11/2013 | Muhamad | 384/577 |
| 2007/0248298 A1 * | 10/2007 | Chihara | 384/579 |

FOREIGN PATENT DOCUMENTS

| | | | |
|---|---|---|---|
| DE | 10320322 A1 | 12/2004 | |
| DE | 102008027305 B3 * | 7/2009 | B23P 15/00 |
| DE | 102009041372 A1 | 3/2011 | |
| EP | 2211066 A1 | 7/2010 | |
| GB | 2103307 A * | 2/1983 | F16C 33/54 |
| JP | 2013007435 A * | 1/2013 | |
| JP | 2013108587 A * | 6/2013 | |
| WO | 2006026947 A1 | 3/2006 | |

* cited by examiner

METHOD, CAGE AND ROLLING BEARING

CROSS REFERENCE TO RELATED APPLICATION

This is a National Stage application claiming the benefit of International Application Number PCT/SE2013/000017 filed on 6 Feb. 2013, which claims the benefit of Sweden Patent Application 1200091-5 filed on 14 Feb. 2012, both of which are incorporated herein by reference in their entireties.

FIELD OF THE INVENTION

The invention relates to the field of bearings, such as roller bearings and ball bearings. According to a first aspect, the invention concerns a method to produce a cage for a rolling bearing. According to a second aspect, the invention concerns a cage. According to a third aspect, the invention concerns a rolling bearing.

BACKGROUND OF THE INVENTION

Cages or retainers are well known for holding and maintaining rolling elements, such as balls and/or rollers, in rolling bearings. There are different ways of making a cage for a rolling bearing. One common way of making a cage, especially for larger bearings over 500 mm in diameter, is to start from a ring-shaped material and subsequently perform a machining operation to form pockets for the rolling elements. The starting ring material is often made by centrifugal casting, cold or hot rolling or even casted rings. This is complicated and expensive.

SUMMARY OF THE INVENTION

An object of the invention is to provide a method and cage design that overcomes the problems of the prior art or to provide an alternative solution to the prior art. More specifically, the object of the invention is to provide a facilitated method to produce a cage which is more cost effective.

According to the first aspect of the invention, the objects are achieved by a method to produce a cage for a rolling bearing, wherein the method comprises the steps of; —providing an elongated metal profile comprising a first and second distant ends, wherein the metal profile is essentially ring-shaped, —subsequently joining the first and second ends of the metal profile to thereby form a closed ring, —forming in the closed ring a plurality of openings on at least one axial side face of the ring, wherein the openings are meant to receive at least one rolling element of the rolling bearing, and wherein the forming of the openings is made by drilling. In an embodiment, the drilling is made from the axial side face of the ring.

This method leads to a very cost effective way of making a cage for a rolling bearing. This method is especially advantageous for large rolling bearings with an outer diameter of 500 mm of larger. Due to this method, it is possible to start from for instance a straight elongated metal profile and then form it into a ring-shape. Thus, it is possible to cut from an elongated metal profile a preferred length that subsequently is bent into a ring-shape before the joining step. In an embodiment, the elongated metal profile is made of sheet metal.

In an embodiment of the method, the essentially ring-shaped metal profile is cut from a helically shaped metal profile. By starting from a metal profile that is helically formed with a specific diameter and subsequently cut to form a ring-shaped element is a cost effective way of making the ring-shaped element. Due to this, there is no need to make a bending operation, which is the case if starting from a straight elongated metal profile.

In an embodiment of the invention, a plurality of openings are formed on both axial side faces of the closed ring, and wherein the forming is made by drilling.

In an embodiment of the invention, a radial cross section of the closed ring is in the shape of; a rectangle, a curved profile, or a V-shaped profile. There are of course many other possible forms of the radial cross section of the ring. If the cage is e.g. for a spherical roller bearing with two roller rows, an essentially V-shaped profile would be preferable. The profile would then essentially follow the two raceways on the inner ring of the bearing. Depending on the type of bearing, any type of matching profile of the cross section of the ring would be recognized by a skilled person.

In an embodiment of the invention, the closed ring after the drilling step comprises a plurality of axially extending bars around the circumference of the closed ring, and wherein at least one of the bars is pressed into a shape such that the at least one bar is thinner in an axial mid section of the bar than in the outer axial ends of the bar. When the cage is holding a number of spherical rollers, the bars will mostly contact the roller elements at its outer ends. Therefore, there is no need to have a thick section of the bars in their mid section. Therefore, the cage will be lighter in weight. Furthermore, less material needed means that the cage will be cheaper due to lower material cost. In an embodiment, the profile of the radial cross section of the ring is such that the bars after drilling will have a shape with a thinner mid section than in the outer axial ends of the bar.

In an embodiment of the invention, the joining is made by any of; spot welding, continuous welding, laser welding, or flash butt welding.

In an embodiment of the invention, a subsequent machining step is performed after the drilling step. For instance, a machining step to smoothen corners and other areas of the cage may be performed.

According to the second aspect of the invention, the objects are achieved by a cage produced according to the method according to the first aspect of the invention. All embodiments of the first aspect of the invention are applicable to all embodiments of the 25 second aspect of the invention and vice versa.

In an embodiment of the invention, the closed ring of the cage has a radial thickness of: 5 mm, 10 mm, 20 mm, 30 mm, 40 mm, 50 mm, or 60 mm.

According to the third aspect of the invention, the objects are achieved by a rolling bearing, comprising, an inner ring, an outer ring and a plurality of rolling elements interposed between the inner and outer ring, wherein the rolling bearing further comprises a cage according to the second aspect of the invention. All embodiments of the third aspect of the invention are applicable to all embodiments of the first and second aspect of the invention and vice versa.

BRIEF DESCRIPTION OF DRAWINGS

The present invention will hereinafter be further explained by means of non-limiting examples with reference to the appended figures where.

It should be noted that the drawings have not been drawn to scale and that the dimensions of certain features have been exaggerated for the sake of clarity.

DETAILED DESCRIPTION OF DRAWINGS

Figure 1:
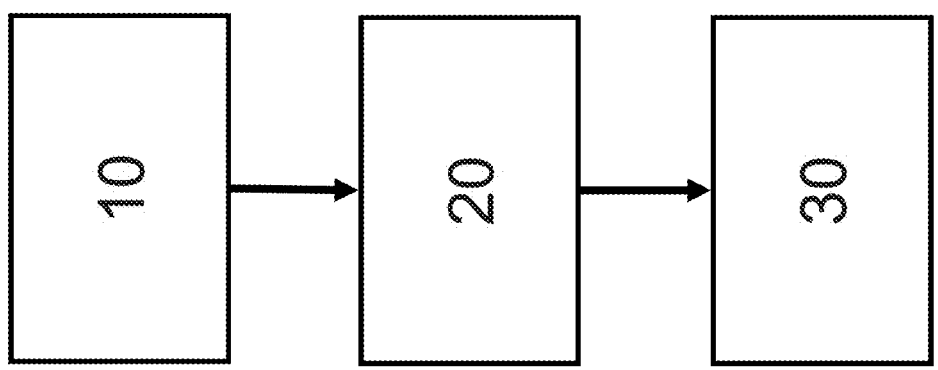
FIG. 1 shows a block diagram of an embodiment of the method according to the invention.

FIG. 1 discloses a block diagram of an embodiment of the method according to the invention. In the first step 10, an elongated metal profile 1 is provided that comprises a first 12 and second 13 distant ends, wherein the metal profile 1 is essentially ring-shaped. In the second step 20, the first 12 and second ends 13 of the metal profile 1 are joined together to thereby form a closed ring 1a. The joining may be made by for instance spot welding. In the third step 30, a plurality of openings 14 are formed in the closed ring 1a on at least one axial side face of the closed ring 1a, wherein the openings 14 are meant to receive at least one rolling element 43 of the rolling bearing 40, and wherein the forming of the openings 14 is made by drilling from the at least one axial side face of the closed ring 1a.

Figure 2:
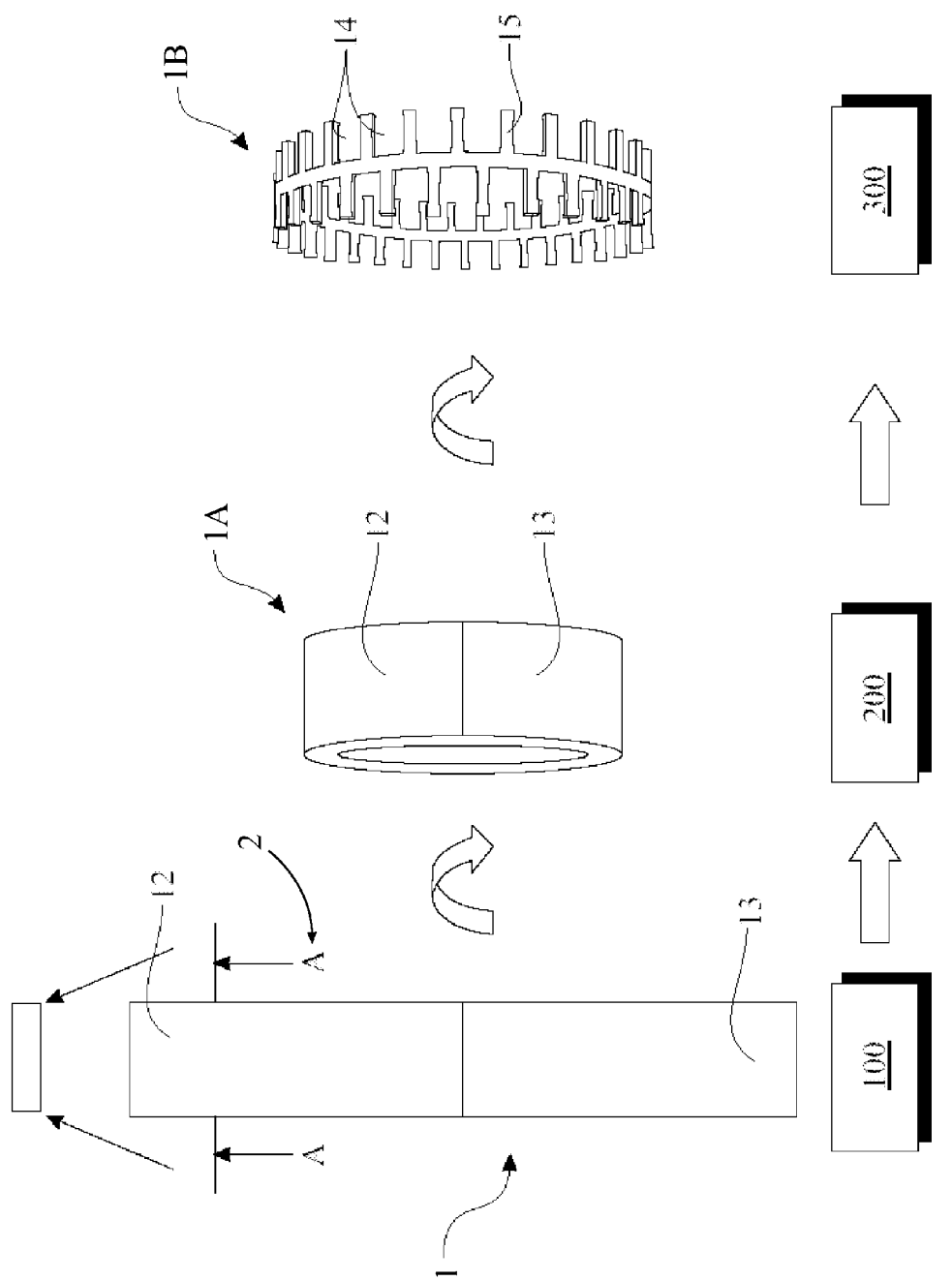
FIG. 2 shows different stages of an embodiment of the method according to the invention.

FIG. 2 discloses different stages of an embodiment of the method according to the invention. In the first stage 100 to the left is an elongated metal profile 1 shown comprising a first and second distant ends 12 and 13. In this illustration, the metal profile is essentially straight. Of course, the metal profile 1 may have many other shapes, e.g. it may be bent like a curve or it may be circularly formed. The metal profile 1 is subsequently bent into an essentially circular form followed by a joining step wherein the first and second distant ends 12 and 13 are joined together (seen in stage 200 in FIG. 2) forming a the closed ring 1a. The joining may for instance be made by spot welding which will be a cost efficient method to join the two ends 12 and 13. The metal profile 1 is shown as a closed ring in the second stage of the illustrated method in FIG. 2. Furthermore, in stage 100, the radial cross section along a plane A-A, generally shown at 2, of the metal profile 1 is shown. In this embodiment, the cross section is in the form of a rectangle. However, the cross section may have many other forms, such as for instance a V-shaped profile which would be especially advantageous for a double row spherical roller bearing. In the third stage 300 is a finished cage 1b shown. The closed ring 1a has now been further modified by forming a plurality of openings 14 on the two axial side faces of the cage 1b. Furthermore, a plurality of bars 15 are also shown which are created when drilling and creating the openings 14. The bars 15 may have a similar thickness along its axial extension. In another embodiment, the bars 15 have different thickness along its axial extension. Preferably, the bar 15 is thinner in a mid section in the axial extension of the bar 15. This is especially advantageous when the rollers 43 are barrel shaped, such as in a spherical roller bearing 40. Furthermore, the finished cage 1b shown in stage 300 in FIG. 2 comprises the bars 15 and the openings 14 on both axial side faces of the cage 1b. The cage 1b may also be designed with the bars 15 and the openings 14 on only one axial side face of the cage 1b. In an embodiment, two cages with the bars 15 and the openings 14 on opposite axial side faces of the cages are joined together on their respective axial sides where no the bars 15 and the openings 14 are put. This would result in a the cage 1b as shown in stage 300 in FIG. 2, with the difference that the cage 1b is made of two closed rings with the bars 15 and openings on bots axial sides of the cage 1b. The two closed rings may for instance be joined by welding, such as spot welding. In another embodiment, the two closed rings are joined together by screws and/or nuts.

Figure 3:
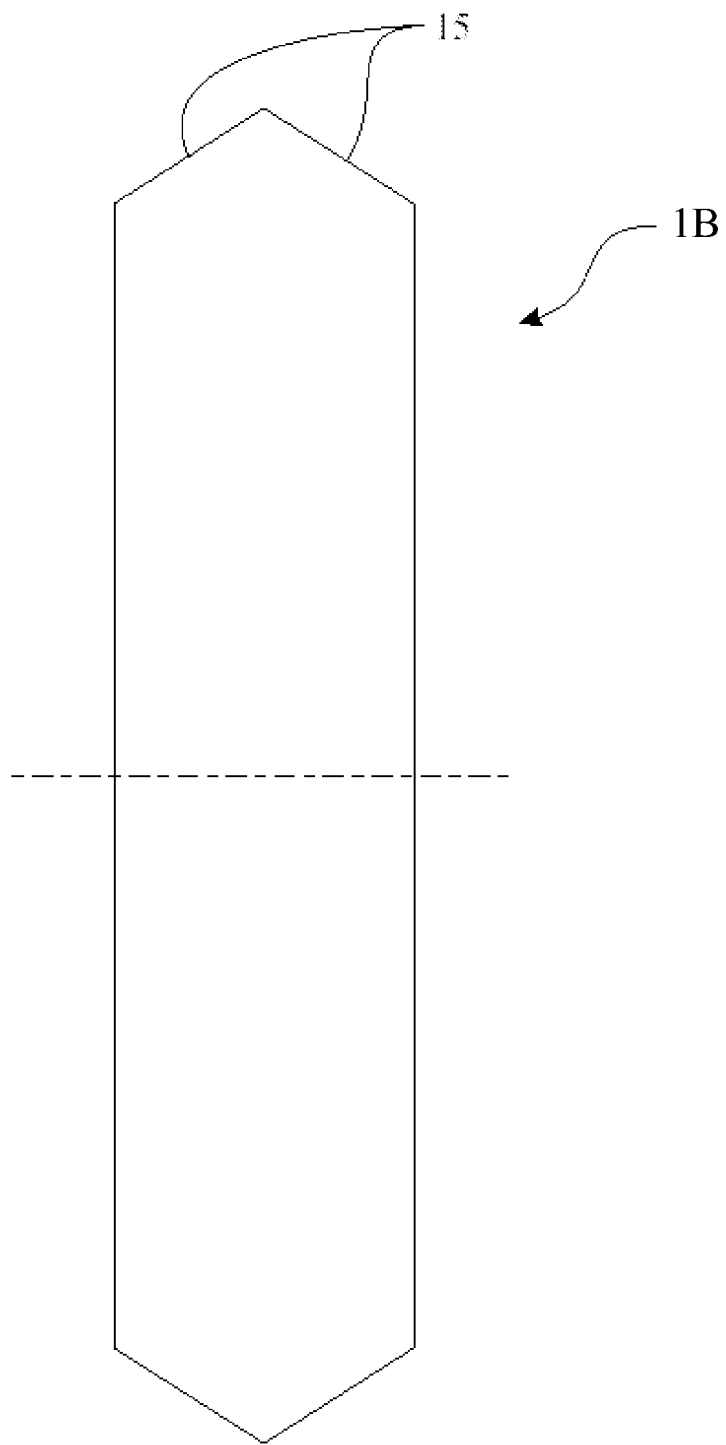
FIG. 3 shows an embodiment of a cage according to the invention.

FIG. 3 shows an exemplifying embodiment of the cage 1b according to the invention. More specifically, the figure shows a cross section of the cage 1b. The cross section is a cross section of a plane, wherein the axial center line of the cage 1b is in the plane. The cage 1b seen in the figure has a V-shaped cross section. The cage may be made by for instance one or two closed rings. The V-shape leads to that the bars 15 on the two axial sides of the cage 1b will have a specific angle relative each other. The angle may for instance be such that is matches the relative angle between two raceways on a ring of a rolling bearing, which for instance is disclosed in FIG. 4.

Figure 4:
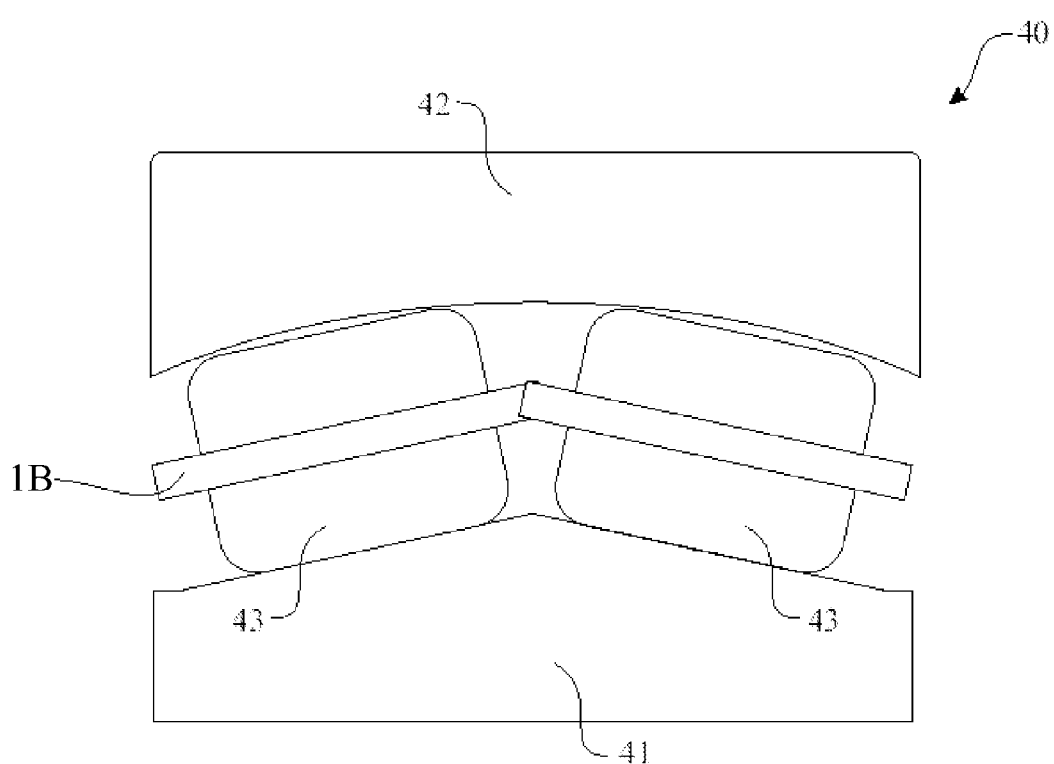
FIG. 4 shows an embodiment of a rolling according to the invention.

FIG. 4 shows an exemplifying embodiment of a rolling bearing 40 according to the invention. The bearing 40 comprises an inner ring 41, an outer ring 42 and two rows of roller elements 43 interposed between the two rings 41 and 42. The roller elements are retained by the cage 1b according to the invention. The cross section of the cage 1b is V-shaped as described in some of the embodiments above. As can be seen, the V-shaped profile matches the relative angle of the two raceways on the inner ring 41 onto which the roller elements roll during operation of the bearing 40. In this example, the bearing 40 is a spherical roller bearing. This cage 1b leads to that it will be cheaper to manufacture compared to known cages. Especially, the cost savings due to this cage 1b are larger for larger bearings with an outer diameter of 500 mm or more. For such bearings, the thickness of the radial cross section of the cage will be above 20 mm. In an embodiment, the thickness of the radial cross section of the cage 1b for such bearings (outer diameter above 500 mm) will be above 30 mm. In an embodiment, the thickness of the radial cross section of the cage 1b for such bearings (outer diameter above 500 mm) will be above 40 mm. In an embodiment, the thickness of the radial cross section of the cage 1b for such bearings (outer diameter above 500 mm) will be above 50 mm.

The invention claimed is:

1. A method to produce a cage for a rolling bearing, the method comprising steps of:
   providing an elongated metal profile comprising a first and second distant ends the metal profile being essentially ring-shaped,
   joining the first and second ends of the metal profile to thereby form a closed ring,
   forming in the closed ring a plurality of openings on at least one axial side face of the ring, wherein the openings being meant to receive at least one rolling element of the rolling bearing, and
   wherein the forming of the openings is made by drilling thereby forming a plurality of axially extending bars around a circumference of the closed ring, with at least one of the axially extending bars pressed into a shape such that the at least one axially extending bar is thinner in an axial mid section of the axially extending bar than in an outer axial end of the bar.

2. The method to produce the cage according to claim 1, wherein the drilling is made from the axial side face of the ring.

3. The method according to claim 1 wherein the elongated metal profile is bent into a ring-shape before the joining step.

4. The method according to claim 1 wherein the essentially ring-shaped metal profile is cut from a helically shaped metal profile.

5. The method according to claim 1 wherein a plurality of openings are formed on both axial side faces of the closed ring, and wherein the forming is made by drilling.

6. The method according to claim 1 wherein a radial cross section of the closed ring is in the shape of:

a rectangle,
a curved profile, or
a V-shaped profile.

7. The method according to claim 1,
wherein the joining is made by any of:
spot welding,
continuous welding,
laser welding, or
flash butt welding.

8. The method according to claim 1 wherein a subsequent machining step is performed after the drilling step.

9. A cage comprising,
an elongated metal profile comprising a first distant end and a second distant ends, the metal profile being essentially ring-shaped, wherein the first and second ends of the metal profile are joined together forming a closed ring,
a plurality of drilled openings formed on at least one axial side face of the ring, wherein the openings are meant to receive at least one rolling element of a rolling bearing; and
a plurality of axially extending bars around a circumference of the closed ring, with at least one of the axially extending bars being thinner in an axial mid section of the axially extending bar than in an outer axial end of the bar.

10. The cage according to claim 9,
wherein the closed ring has a radial thickness of:
5 mm, 10 mm, 20 mm, 30 mm, 40 mm, 50 mm, or 60 mm.

11. A rolling bearing comprising,
an inner ring,
an outer ring,
a cage having:
an elongated metal profile comprising a first distant end and a second distant ends, the metal profile being essentially ring-shaped, wherein the first and second ends of the metal profile are joined together forming a closed ring,
a plurality of drilled openings formed on at least one axial side face of the ring, wherein the openings are meant to receive at least one rolling element of a rolling bearing;
a plurality of axially extending bars around a circumference of the closed ring, with at least one of the axially extending bars being thinner in an axial mid section of the axially extending bar than in an outer axial end of the bar; and
a plurality of rolling elements interposed between the inner and outer ring and held therein by the cage.

* * * * *